(12) United States Patent
Chughtai et al.

(10) Patent No.: US 8,361,216 B2
(45) Date of Patent: Jan. 29, 2013

(54) METHOD PROVIDING FOR A LOW RELEASE OF $H_2S$ DURING THE PREPARATION OF SULFUR-EXTENDED ASPHALT

(75) Inventors: Majid Jamshed Chughtai, Chester (GB); Helen Jayne Davies, Frodsham (GB); Richard Walter May, Wichita, KS (US); David Strickland, Manchester (GB)

(73) Assignee: Shell Oil Company, Houston, TX (US)

( * ) Notice: Subject to any disclaimer, the term of this patent is extended or adjusted under 35 U.S.C. 154(b) by 363 days.

(21) Appl. No.: 12/847,648

(22) Filed: Jul. 30, 2010

(65) Prior Publication Data

US 2011/0290151 A1 Dec. 1, 2011

Related U.S. Application Data

(60) Provisional application No. 61/349,007, filed on May 27, 2010.

(51) Int. Cl.
*C08L 95/00* (2006.01)
(52) U.S. Cl. ........................ 106/274; 106/275
(58) Field of Classification Search ............ 106/274, 106/275
See application file for complete search history.

(56) References Cited

U.S. PATENT DOCUMENTS

| | | | | |
|---|---|---|---|---|
| 3,936,534 A | | 2/1976 | Schallis | 427/215 |
| 3,960,585 A | * | 6/1976 | Gaw | 106/274 |
| 4,081,500 A | * | 3/1978 | Malcolm | 264/9 |
| 4,154,619 A | * | 5/1979 | Pronk | 106/274 |
| 4,298,397 A | * | 11/1981 | Burris | 106/274 |
| 4,353,852 A | | 10/1982 | Tse | 264/37 |
| 4,756,763 A | * | 7/1988 | Etnyre | 106/274 |
| 4,769,288 A | * | 9/1988 | Saylak | 106/274 |
| 5,435,945 A | | 7/1995 | De Paoli et al. | 264/7 |
| 6,824,600 B2 | * | 11/2004 | Bailey et al. | 106/275 |
| 6,863,724 B2 | * | 3/2005 | Bailey et al. | 106/275 |
| 8,025,724 B2 | * | 9/2011 | Deme | 106/274 |
| 2007/0125268 A1 | * | 6/2007 | Deme | 106/281.1 |
| 2010/0288165 A1 | * | 11/2010 | Deme | 106/274 |
| 2011/0041729 A1 | * | 2/2011 | Colange et al. | 106/270 |
| 2011/0140294 A1 | * | 6/2011 | Pyke et al. | 264/6 |

FOREIGN PATENT DOCUMENTS

| WO | WO2005059016 | 6/2005 |
|---|---|---|
| WO | WO2008046899 | 4/2008 |
| WO | WO2009121917 | 10/2009 |
| WO | WO2009/155682 | 12/2009 |

* cited by examiner

*Primary Examiner* — Helene Klemanski
(74) *Attorney, Agent, or Firm* — Charles W. Stewart

(57) ABSTRACT

A method of making a sulfur-extended asphalt mixture with a minimum of hydrogen sulfide gas release into the atmosphere by using sulfur granules with specific physical properties and which are made by successively coating a starting sulfur seed particle with liquid sulfur that is solidified between coatings to thereby build up the a sulfur particle of a desired size. The sulfur granules are used to in the preparation of a sulfur, bitumen and aggregate mixture to provide the sulfur-extended asphalt.

19 Claims, No Drawings

METHOD PROVIDING FOR A LOW RELEASE OF H₂S DURING THE PREPARATION OF SULFUR-EXTENDED ASPHALT

This application claims the benefit of U.S. Provisional Application Ser. No. 61/349,007, filed May 27, 2010.

The invention relates to a method that provides for the low release of $H_2S$ during the preparation of sulfur-extended asphalt.

Asphalt is commonly used in the construction and paving of roads. As the term is used in this specification, asphalt is a mixture of aggregate material, such as sand, gravel, and crushed stone, with hot bitumen. The bitumen coats the aggregate material to give the asphalt, which may be spread as a uniform layer upon a road bed and compacted and smoothed with heavy rolling equipment.

It is recognized in the art that sulfur may be mixed with bitumen in the preparation of asphalt to provide a sulfur-extended asphalt having certain enhanced properties or reduced amounts of bitumen that is displaced by the use of the elemental sulfur in the asphalt mix. One of the problems, however, that is encountered with the use of sulfur as an additive to asphalt mixtures is the unwanted release of odorous gaseous emissions such as hydrogen sulfide that results from the mixing of sulfur with the asphalt components during the preparation of the asphalt.

The hydrogen sulfide that is released during the mixing of sulfur with the bitumen and aggregate components of asphalt may be derived from several sources. One such source is the unwanted formation of hydrogen sulfide that results from the dehydrogenation reactions that occur between bitumen and sulfur at the hot mixing temperatures, e.g., temperatures greater than 140° C.

Another source of the hydrogen sulfide release is the actual hydrogen sulfide that is dissolved or entrained within the sulfur source itself and which is released upon the melting and mixing of the resulting liquid sulfur with the asphalt mixture.

The prior art presents numerous approaches to the reduction of $H_2S$ emissions that occur during the mixing and preparation of sulfur-extended asphalt. One approach to the reduction of $H_2S$ emissions is to use sulfur pellets that contain a concentration of an $H_2S$ suppression chemical as the source of sulfur for the asphalt mixture. An example of such a sulfur pellet that comprises an $H_2S$-suppressant is disclosed in US 2007/0125268. In this publication, there is disclosed a particular type of sulfur pellet that includes a concentration of an $H_2S$-suppressant that is, typically, a compound selected from a class of free radical inhibitors and redox catalysts. The sulfur pellet having a concentration of the $H_2S$-suppressant is manufactured by mixing elemental sulfur with the $H_2S$-suppressant and, optionally, a filler, to form a mixture and then shaping or pelletizing the mixture. A number of different means and methods are disclosed for pelletizing the mixture, including, for example, the use of granulators, rotating drums, cooled conveyor belts onto which is sprayed sulfur droplets, and sprayers for applying successive coats of the liquid mixture onto solidified particles. The sulfur pellets may be used in the manufacture of an asphalt mixture of sulfur, bitumen, and aggregate and were found to provide for a substantial decrease in $H_2S$ release in the mixing of asphalt when compared with elemental sulfur pastilles that do not contain an $H_2S$-suppressant.

Another approach disclosed in the prior art for reducing the amount of $H_2S$ release during the production or mixing of asphalt is presented in the WO publication 2009/121917. The approach presented in this publication is a process that utilizes paraffin wax as an additive in the mixing process to reduce the required temperature at which the bitumen and aggregate components of the asphalt mixture are to be mixed. This reduction in mixing temperature provides the benefit of reducing the amount of $H_2S$ that is released during the mixing of the asphalt components. The wax may separately be added to the components of the asphalt mixture during their mixing or it may in a preferred embodiment be incorporated within pellets of sulfur and wax with the pellets then being mixed with the bitumen and aggregate components of the asphalt mixture.

As is recognized in the prior art, it is desirable to have improved or a variety of methods that provide for reduced or low release of hydrogen sulfide gas during the preparation of sulfur-extended asphalt.

Accordingly, the inventive method provides for a reduced or low release of $H_2S$ during the preparation of sulfur-extended asphalt. This method comprises providing sulfur granules for use in the preparation of the sulfur-extended asphalt. The sulfur granules are prepared by forming solidified sulfur seed particles by a method including intersecting a spray of water droplets through a spray of liquid sulfur droplets to thereby form the solidified sulfur seed particles, and, thereafter, coating the solidified sulfur seed particles with at least one layer of liquid sulfur, wherein each of the at least one layer of liquid sulfur is solidified thereby forming the sulfur granules. The sulfur granules are mixed with bitumen and aggregate to make the sulfur-extended asphalt but with a low release of $H_2S$.

The present invention is directed to a method of preparing sulfur-extended asphalt. It is understood that sulfur-extended asphalt, as the term is used in this specification, is a mixture of elemental sulfur, bitumen and aggregate in proportions that provide an asphalt mixture that may suitably be used as a road paving material. It is in the preparation of the sulfur-extended asphalt by the addition of elemental sulfur to a hot bitumen material or a hot mixture of bitumen and aggregate that emissions of odorous gas compounds are released into the atmosphere. The odorous gas compounds may include hydrogen sulfide ($H_2S$), carbonyl sulfide (COS), sulfur dioxide ($SO_2$), disulfide ($CS_2$), methyl mercaptan ($CH_3SH$) and ethyl mercaptan ($CH_3CH_2SH$). But, the most significant of these odorous gas compounds are $H_2S$ and $SO_2$. Among these, $H_2S$ is the more significant odorous gas compound of which the release thereof into the atmosphere is reduced or minimized by the inventive method.

The aggregate component of the sulfur-extended asphalt mix can be any material that is suitably or typically used in the practice of preparing and manufacturing asphalt mixtures that comprise aggregate and bitumen. Generally, an aggregate is any suitable hard, inert mineral material that is used for mixing in graduated fragments and can be such materials as sand, gravel, crushed stone, coral, and slag.

The bitumen component of the sulfur-extended asphalt mix functions as a binder that coats the aggregate material to give a bitumen-aggregate mixture that has properties such that it may be spread while hot as a uniform layer upon a road bed and rolled. Bitumen is a mixture of highly viscous organic compounds typically comprising polycyclic aromatic hydrocarbons or comprising asphaltenes, resins and heavy oils. Bitumen may also, and more typically is, a mixture derived from petroleum residues such as residual oils or pitch. A refined bitumen is a crude oil bottom fraction that is obtained by the fractional distillation of crude oil and can have an initial boiling temperature exceeding 525° C. (977° F.).

In the preparation of sulfur-extended asphalt, sulfur is mixed with bitumen and aggregate to provide a mixture of the three components. In one typical method of preparing the sulfur-extended asphalt, solid sulfur pellets are added to either hot liquid bitumen or hot aggregate or to a hot mixture of bitumen and aggregate which are at a temperature that exceeds the melting temperature of the added sulfur so that the solid sulfur pellets melt when mixed with the hot components of the asphalt mixture. It is during this preparation of the sulfur-extended asphalt that undesirable amounts of $H_2S$ gas are released into the atmosphere.

It is believed that the released $H_2S$ gas comes from hydrogenation reactions that occur between bitumen and sulfur at the high mixing temperatures of greater than 135° C. or 140° C. and from the $H_2S$ that is entrained in the solid sulfur pellets used in the preparation of the sulfur-extended asphalt and released when melted. The inventive method provides for the preparation of a sulfur-extended asphalt but with a much reduced release of $H_2S$ gas during its mixing and preparation.

The inventive method provides for the preparation of sulfur-extended asphalt with a minimal or low or reduced release of $H_2S$ during the preparation of the asphalt mix. In the inventive method, sulfur granules, having specifically defined properties that provide for the reduced $H_2S$ release during the asphalt mixing, are used in the preparation of the sulfur-extended asphalt. In a preferred embodiment of the method, the sulfur granules made by a specific granulation process or method are used in the preparation of the sulfur-extended asphalt and provide for a much lower release of $H_2S$ than solid sulfur pellets made by other methods.

The sulfur granules provided for use in the preparation of the sulfur-extended asphalt are particles that comprise predominantly of elemental sulfur and have, on average, a maximum size, i.e., a length dimension, that is in the range upwardly to about 25 mm. It is preferred for the sulfur granules utilized in the inventive method to have an average maximum size within the range of from 0.5 mm to 15 mm, more preferably, in the range of from 1 mm to 10 mm, and, most preferably, from 1.5 mm to 8 mm or from 2 mm to 6 mm or from 2 mm to 5 mm.

When referring herein to the maximum size of a given particle, what is meant is that it has a maximum length dimension in any given plane that cuts through the given particle with a linear distance from end-to-end of the portion of the particle that is within such plane of no more than the indicated maximum size. An example of a maximum size of a particle is when it is a perfect sphere, which in this case, the maximum size of the particle would be its diameter. A reference herein to the average maximum size of particles means the average of the maximum sizes of the particles included within a representative sample.

While it is believed that the manner by which the sulfur granules are prepared is important to imparting the desirable physical and compositional properties that make the sulfur granules particularly suitable for use in the inventive method, the sulfur granules may have any one of a variety of possible geometries, including, irregular shapes and more symmetrical shapes. Due to the manner by which the sulfur granules are prepared, it is typical, and generally preferred, for them to be spherical (nominally) in shape. Thus, when the sulfur granules are spherical in shape their diameter will define the maximum size.

One method of sizing the sulfur granules is by the use of sieve separators. The sulfur granules may be placed atop a wire mesh sieve of a given size that is shaken to assist the passage of the sulfur granules through the sieve openings. The larger size sulfur granules are retained on the mesh with the smaller size sulfur granules passing through the mesh openings. Another sieve separator may be used that has the desired smaller sieve openings for the separation of the smaller particles of a desired minimum sulfur granule size. Typically, the sulfur granules used in the inventive method should pass through a standard 7/16 inch (0.438 in. or 11.2 mm) US Mesh and to be retained by a standard No. 40 US Mesh (0.425 mm). It is preferred for the sulfur granule particles to pass through a standard ¼ inch (0.25 in. or 6.3 mm) US Mesh and to be retained by a standard No. 35 US Mesh (0.50 mm) and, preferably, retained by a standard No. 10 US Mesh (2.00 mm).

One particularly important property of the sulfur granules is for them to contain a significantly reduced concentration of entrained or entrapped $H_2S$ gas. It is thought that upon the melting of the sulfur granules upon their mixing with hot bitumen and aggregate during the preparation of an asphalt mixture the entrained $H_2S$ is released and, thus, it is especially important aspect of the inventive method for the sulfur granules to comprise a low concentration of $H_2S$. Thus, the sulfur granules will have the property of exhibiting a headspace $H_2S$ concentration, when tested using the headspace analysis test as described herein, of less than 30 ppmv or 15 ppmv. Preferably, the headspace $H_2S$ concentration exhibited by the sulfur granules is less than 10 ppmv, more preferably, less than 8 ppmv, and, most preferably, less than 5 ppmv.

While the sulfur granules of the invention comprise predominantly elemental sulfur, it is possible for the sulfur to further comprise additive components that impart additional beneficial properties to the sulfur granules. For instance, the sulfur granules might include an $H_2S$ suppressant. Some of the potential $H_2S$ suppressants are mentioned in the above described patent literature and are disclosed in other literature. If an $H_2S$ suppressant is included in the sulfur granules, it is typically present in an amount of less than 10 wt % of the total weight of the sulfur pellet.

The sulfur granules may also further include carbon as another component. Typically, when the sulfur granules include a concentration of carbon, it will be present in an amount up to about 5 wt. % of the total weight of the sulfur granule, preferably, in the range of from 0.25 wt % to 5 wt %, and, most preferably, from 0.25 wt % to 1 wt %. The carbon may be carbon black or any other suitable type or form of carbon. It is an advantageous aspect of the inventive method that it provides a much reduced release of $H_2S$ in the preparation of sulfur-extended asphalt while using sulfur granules having lower required carbon concentration.

The elemental sulfur content of the sulfur granules is at least 60 wt %, based on the total weight of the sulfur granule. Preferably, the sulfur granules will have an elemental sulfur content in the range of from 75 wt % to 100 wt %, and, most preferably, from 90 to 100 wt %.

The bulk density of the sulfur granules can be in the range of from 500 kg/m$^3$ to 2000 kg/m$^3$. Preferably, the bulk density of the sulfur granules is in the range of from 750 kg/m$^3$ to 1750 kg/m$^3$, and, more preferably, from 1000 kg/m$^3$ to 1500 kg/m$^3$. The bulk density is measured in accordance with the standard ASTM test method C29.

An important aspect of the invention includes the method by which the sulfur granules are prepared. It is theorized that it is a result of the specific manner and method by which the sulfur granules are prepared that imparts the properties that make their use in the preparation of the sulfur-extended asphalt especially desirable as compared to the use of other forms of solid sulfur particles, such as, for example, pastilles and flakes.

Generally, the sulfur granules utilized in the inventive method are prepared by forming solidified sulfur seed particles by a method that includes intersecting a spray of water droplets through a spray of liquid sulfur droplets to form the solidified sulfur seed particles. These solidified sulfur seed particles are then coated with at least one layer of liquid sulfur with each layer of liquid sulfur of the at least one layer of liquid sulfur being solidified before the subsequent coating of liquid sulfur to thereby build up the sulfur granule to the proper size. Suitable methods and apparatuses for making the sulfur granules are described in detail in U.S. Pat. No. 5,435,945 and WO Publication No. 2009/155682, both of which are incorporated herein by reference.

The coating of the solidified sulfur seed particles may include forming from an elevated position a shower of falling solidified sulfur seed particles that are coated with liquid sulfur. This coating increases the size of the solidified sulfur seed particles either by passing through the first spray of liquid sulfur droplets or through a second spray of liquid sulfur droplets.

Thus, the sulfur granules of the invention are prepared by spraying a spray of water that is at a temperature generally in the water temperature range of from about 0° C. to about 100° C., preferably from 5° C. to 75° C., and, more preferably, from 10° C. to 50° C., and spraying a spray of liquid sulfur that is at a temperature generally in the sulfur temperature range of from about 115° C. to about 200° C., preferably from 120° C. to 175° C., and, more preferably, from 125° C. to 155° C. The spray of water and the spray of liquid sulfur are discharged so as to intersect and effect contact with each other in order to lower the temperature of the spray of liquid sulfur to cause sulfur droplets to solidify and form sulfur seed particles. The sulfur seed particles are sprayed with liquid sulfur to coat them with solid coating of sulfur to form sulfur granules that are larger than the sulfur seed particles.

One embodiment of the method of preparing the sulfur granules of the invention includes the use of spray nozzles that are positioned within a granulation drum so that the spray nozzles are adjacent to a curtain of falling sulfur granules and previously generated sulfur seed particles and so that at least portion of the spray of liquid sulfur passes through the spray of water and into the curtain of falling sulfur granules and previously generated sulfur seed particles. This provides for the coating of the sulfur granules and previously generated sulfur seed particles of the curtain of falling sulfur granules and previously generated sulfur seed particles with liquid sulfur that is thereafter solidified so as to increase the size of the sulfur granules and previously generated sulfur seed particles and to form sulfur granules from the sulfur seed particles and increase the size of the sulfur granules. The final sulfur granules yielded form this method will have the size and properties as described in detail elsewhere herein.

The sulfur granules of the invention are mixed with bitumen and aggregate to make the sulfur-extended asphalt. Any method or means known to those skilled in the art may be used to mix the sulfur, bitumen and aggregate components of the sulfur-extended asphalt. Generally, heated bitumen is mixed with heated aggregate with the solid sulfur granules being added to either the heated bitumen or the heated aggregate or the heated bitumen and aggregate mixture. The hot components of either bitumen or aggregate or mix are preferably at a temperature that exceeds the melting temperature of the sulfur granules so as to provide for the melting of the sulfur and substantially homogenous mixing of the sulfur with the asphalt components.

The mixing temperature at which the hot bitumen or aggregate components are mixed to form the sulfur-extended asphalt is, generally, in the range of from 100° C. to 200° C., but, preferably, the temperature is from 115° C. to 175° C., more preferably, from 120° C. to 150° C., and, most preferably, from 125° C. to 140° C.

The amount of bitumen that is mixed with the aggregate and sulfur to form the sulfur-extended asphalt typically is at least 1 wt % of the sulfur-extended asphalt. The upper limit of bitumen utilized in the asphalt mixture is about 10 wt % of the sulfur-extended asphalt. It is preferred for the sulfur-extended asphalt to comprise from 1 wt % to 10 wt % bitumen. It is more preferred for the sulfur-extended asphalt to comprise from 2 to 8 wt % bitumen, and, most preferred, from 3 to 6 wt %.

Aggregate is the predominant component of the sulfur-extended asphalt mixture, and it can be present therein in an amount upwardly to 99 wt %. Typically, the aggregate is present in the sulfur-extended asphalt mixture in an amount in the range of from 50 wt % to 99 wt % of the total weight of the sulfur-extended asphalt. More typically, the sulfur-extended asphalt mixture comprises aggregate in the range of from 60 wt % to 98 wt %.

The amount of sulfur combined and mixed with the bitumen and aggregate components to form the sulfur-extended asphalt mixture should be such as to provide asphalt having the desired properties and, generally, is such as to provide a weight ratio of the elemental sulfur-to-bitumen in the sulfur-extended asphalt in the range of from 1:0.1 to 1:10. The preferred amount of elemental sulfur mixed with the bitumen and aggregate components is such as to provide a weight ratio of elemental sulfur-to-bitumen in the sulfur-extended asphalt mixture in the range of from 1:0.5 to 1:6. The more preferred weight ratio of elemental sulfur-to-bitumen of the sulfur-extended asphalt mixture is in the range of from 1:1 to 1:4.

The following examples are presented to illustrate certain embodiments of the inventive method, but they should not be construed as limiting the scope of the invention.

EXAMPLE 1

This Example describes and defines the headspace analysis test used in providing a standardized method for determining the relative quantities of odorous gases contained in various forms of solid sulfur materials.

A 10 gram sample of a given solid sulfur material that has been broken into particles having particle size dimensions of less than 0.5 inches (12.7 mm) and greater than 4 mesh (4.76 mm) is placed in a 100 ml headspace bottle that is sealed. The headspace bottle is placed in an oven and maintained at a temperature of 140° C., at which temperature, the sulfur melts. After one hour in the oven, the bottle is agitated so as to assist the release of the gases that are dissolved in the sulfur sample. After two hours in the oven and maintaining the headspace bottle at the temperature of 140° C., the headspace bottle is removed from the oven and an aliquot portion of the headspace gas of the headspace bottle is taken with the aid of a gas sampling syringe. The gas sample is analyzed using standard gas chromatography methodology and equipment. For instance, a Varian 3800 Gas Chromatograph equipped with a thermal conductivity detector (TCD) in series with a flame photometric detector (PFPD) may be used in the gas chromatograph analysis of the headspace gas sample to determine the composition of the gas that includes hydrogen sulfide ($H_2S$), carbonyl sulfide (COS), sulfur dioxide ($SO_2$), methyl mercaptan ($CH_3SH$) and ethyl mercaptan ($CH_3CH_2SH$). The compositional results of this analysis may then be presented.

EXAMPLE 2

This Example presents the results of the headspace analysis tests done on various samples of sulfur pellet or granule products and the sulfur sources used in their manufacture.

Headspace analysis tests were conducted on a variety of sulfur samples taken from several sources in order to determine the odorous gas compounds that are contained in the sulfur samples.

The sulfur generated in Plant No. 1 was formed into granules using the GX granule forming process that involves formation of a sulfur seed particle upon which thin coats of liquid sulfur is sprayed in successive layers of solidified sulfur to build up a granule having an approximate diameter of 6 mm. The sulfur source used to make the GX granules, GX granules larger than No. 4 mesh (4.75 mm opening), and GX granules smaller than No. 4 mesh were each tested using the headspace analysis test. These results are presented in Table 1.

TABLE 1

Results of Headspace Analysis Tests Done on Sulfur Samples From Plant No. 1

| Odorous sulfur compound | Sulfur before GX granule formation | GX granule (>No. 4 mesh) | GX granule (<No. 4 mesh) |
| --- | --- | --- | --- |
| $H_2S$ | 40 | 2 | 1 |
| COS | Less than 0.1 | 1.6 | 1.2 |
| $SO_2$ | 95 | 3.5 | 1.5 |
| $CS_2$ | 1.4 | 4.6 | 3.2 |
| $CH_3SH$ | Less than 0.1 | Less than 0.1 | Less than 0.1 |
| $CH_3CH_2SH$ | Less than 0.1 | Less than 0.1 | Less than 0.1 |

The sulfur generated in Plant No. 2 was formed into pastilles using a known rotoforming process for making sulfur pastilles. The sulfur pastilles are made by feeding a regular array of small, liquid sulfur droplets onto a continuously moving steel belt which is cooled by spraying water onto its underside. The cooled sulfur droplets are discharged from the moving steel belt as solid hemispherical pastilles. The sulfur source before it was formed into the solid sulfur pastilles and the solid sulfur pastilles that were formed using the rotoforming process were tested using the headspace analysis test. These results are presented in Table 2.

TABLE 2

Results of Headspace Analysis Tests Done on Sulfur Samples From Plant No. 2

| Odorous sulfur compound | Sulfur before pastillation | Rotoform pastilles |
| --- | --- | --- |
| $H_2S$ | 21 | 21 |
| COS | Less than 0.1 | Less than 0.1 |
| $SO_2$ | 119 | 98 |
| $CS_2$ | 9.0 | 9.8 |
| $CH_3SH$ | Less than 0.1 | Less than 0.1 |
| $CH_3CH_2SH$ | Less than 0.1 | Less than 0.1 |

The final sample of solid sulfur pellets tested using the headspace analysis test was a sample of commercially available sulfur pastille pellets that include a concentration of carbon and which are marketed under the trademark Thiopave®. The results of the headspace analysis test of this sample are presented in Table 3.

TABLE 3

Results of Headspace Analysis Tests Done on Sample of Commercially Available Carbon-Containing Sulfur Pastille

| Odorous sulfur compound | Sample of Commercial Carbon-containing Sulfur pastille |
| --- | --- |
| $H_2S$ | 14 |
| COS | 1.5 |
| $SO_2$ | Not available |
| $CS_2$ | 1.3 |
| $CH_3SH$ | Less than 0.1 |
| $CH_3CH_2SH$ | Less than 0.1 |

As may be observed from the data presented in Tables 1, 2 and 3, the GX sulfur granules exhibited a significantly lower headspace $H_2S$ concentration than those of the rotoform pastilles and the carbon-containing sulfur pastilles. The GX granules had an headspace $H_2S$ concentration of 1 or 2 ppmv, which is significantly less than the 21 ppmv headspace $H_2S$ concentration exhibited by the rotoform sulfur pastilles and the 14 ppmv headspace $H_2S$ concentration exhibited by the sample of commercially available carbon-containing sulfur pastilles.

It is further noted that the supply sulfur used in the formation of the GX granules had a headspace $H_2S$ concentration of 40 ppmv, which is significantly higher than that of the GX granules which were prepared with the supply sulfur. It is believed that the significantly reduced amount of entrained $H_2S$ in the GX granules over the entrained $H_2S$ in the supply sulfur results from the unique method by which the GX granules are made. It is theorized that in the GX granulation process the sulfur is degassed by aeration of the thin coats of liquid sulfur as they are successively sprayed upon the sulfur seed and granule in building up the granule size. This theory appears to be further supported by the data presented in Table 2 which shows the supply sulfur used in the formation of the rotoform pastilles having the same headspace $H_2S$ concentration as the rotoform pastilles made from such supply sulfur.

The sulfur pastille pellets having the carbon concentration exhibit a headspace $H_2S$ concentration of 14 ppmv. This headspace $H_2S$ concentration value is lower than the headspace $H_2S$ concentration of the rotoform pastilles but is higher than the headspace $H_2S$ concentration of the GX granules, thus, indicating that they have a lower amount of entrained $H_2S$ than the rotoform pastilles but a higher amount of entrained $H_2S$ than the GX granules.

EXAMPLE 3

This Example describes several sulfur extended asphalt mixtures made by using the different sulfur sources or pellets that are described in Example 2. Also presented are the $H_2S$ gas concentrations of the enclosed headspace above the asphalt samples that were measured in headspace testing of the sulfur-extended asphalt mixtures prepared using the different sulfur sources.

Paving mixtures were prepared by melting the particular sulfur material, i.e., GX granules or rotoform pastilles, or plain sulfur flake, in an oven and then pouring the liquefied sulfur into a lab mixer containing a mixture of hot aggregate and bitumen (mix formulation of 93.6 wt % mineral aggregate and 3.9 wt % bitumen), which had been premixed for 15 seconds. Mixing of the components was continued for 90 seconds. 4000 grams of the mixture of sulfur, bitumen and aggregate was then poured into two 4-liter insulated cans, which were then covered by a lid. The cans were filled to approximately their mid-point. Gases were allowed to accumulate in the headspace above the paving mixture for 5 minutes, at which point, the hydrogen sulfide gas concentration was measured using a Draeger MiniWarn meter equipped with a pump. The target temperature of the paving mixture was 135° C. to 140° C. The results of the headspace analysis are presented in Table 4.

TABLE 4

Hydrogen Sulfide Gas Concentration in Closed Headspace above Asphalt Mix Prepared Using the Indicated Form of Sulfur

|  | GX granule | Rotoform Pastilles | Typical Refinery Sulphur |
|---|---|---|---|
| $H_2S$, ppmv | 4 | 23 | 42 |
| Temperature of Paving Mixture, °C. | 136 | 141 | 140 |

As the data presented in Table 4 show, the sulfur-extended asphalt mixture prepared using the GX granules had a significantly reduce entrained $H_2S$ gas when compared to the sulfur-extended asphalt mixtures prepared using the other forms of sulfur materials, i.e., rotoform pastilles and typical refinery sulfur. This is an indication that when GX granules are used in the preparation of sulfur-extended asphalt there will result in a much reduced or lower release of $H_2S$ than when other forms of sulfur pellets are used in the asphalt preparation.

That which is claimed is:

1. A method providing for a reduced or low release of $H_2S$ during the preparation of sulfur-extended asphalt, wherein said method comprises:
providing sulfur granules for use in the preparation of said sulfur-extended asphalt, wherein said sulfur granules are prepared by forming solidified sulfur seed particles by a method including intersecting a spray of water droplets through a spray of liquid sulfur droplets to thereby form said solidified sulfur seed particles, and, thereafter, coating said solidified sulfur seed particles with at least one layer of liquid sulfur, wherein each of said at least one layer of liquid sulfur is solidified thereby forming said sulfur granules; and mixing said sulfur granules with bitumen and aggregate to make said sulfur-extended asphalt but with a low release of $H_2S$.

2. A method as recited in claim 1, wherein said sulfur granules have a headspace $H_2S$ concentration of less than 15 ppmv.

3. A method as recited in claim 1, wherein said sulfur granules have an average maximum size dimension in the range upwardly to 25 mm.

4. A method as recited in claim 1, wherein said sulfur granules have a bulk density in the range of from 500 $kg/m^3$ to 2000 $kg/m^3$.

5. A method as recited in any one of claims 1 through 4, wherein said sulfur granules comprise: at least 60 wt % elemental sulfur, up to 5 wt % carbon, and less than 10 wt % $H_2S$ suppressant.

6. A method as recited in claim 1, wherein said spray of water droplet is at a water spray temperature in the range of 0° C. to 80° C. and said spray of liquid sulfur droplets is at a sulfur spray temperature in the range of from 115° C. to 160° C.

7. A method as recited in claim 1, wherein said coating step includes forming from an elevated position a shower of falling solidified sulfur seed particles that are coated with liquid sulfur to thereby increase the size of said solidified sulfur seed particles either by passing through said spray of liquid sulfur droplets or through a second spray of liquid sulfur droplets.

8. A method as recited in claim 1, wherein said sulfur extended asphalt contains at least 1 wt % bitumen, sulfur in an amount to provide a weight ratio of sulfur-to-bitumen in said sulfur extended asphalt in the range of from 1:0.1 to 1:10, and upwardly to 98 wt % aggregate, and wherein said mixing of said sulfur granules, bitumen and aggregate is conducted at a mixing temperature in the range of from 100° C. to 150° C.

9. A method as recited in claim 2, wherein said sulfur granules have an average maximum size dimension in the range upwardly to 25 mm 10. A method as recited in claim 2, wherein said sulfur granules have a bulk density in the range of from 500 $kg/m^3$ to 2000 $kg/m^3$.

11. A method as recited in claim 9, wherein said sulfur granules have a bulk density in the range of from 500 $kg/m^3$ to 2000 $kg/m^3$.

12. A method as recited in claim 2, wherein said sulfur granules comprise: at least 60 wt % elemental sulfur, up to 5 wt % carbon, and less than 10 wt % $H_2S$ suppressant.

13. A method as recited in claim 11, wherein said sulfur granules comprise: at least 60 wt % elemental sulfur, up to 5 wt % carbon, and less than 10 wt % $H_2S$ suppressant.

14. A method as recited in claim 2, wherein said spray of water droplet is at a water spray temperature in the range of 0° C. to 80° C. and said spray of liquid sulfur droplets is at a sulfur spray temperature in the range of from 115° C. to 160° C.

15. A method as recited in claim 13, wherein said spray of water droplet is at a water spray temperature in the range of 0° C. to 80° C. and said spray of liquid sulfur droplets is at a sulfur spray temperature in the range of from 115° C. to 160° C.

16. A method as recited in claim 2, wherein said coating step includes forming from an elevated position a shower of falling solidified sulfur seed particles that are coated with liquid sulfur to thereby increase the size of said solidified sulfur seed particles either by passing through said spray of liquid sulfur droplets or through a second spray of liquid sulfur droplets.

17. A method as recited in claim 15, wherein said coating step includes forming from an elevated position a shower of falling solidified sulfur seed particles that are coated with liquid sulfur to thereby increase the size of said solidified sulfur seed particles either by passing through said spray of liquid sulfur droplets or through a second spray of liquid sulfur droplets.

18. A method as recited in claim 2, wherein said sulfur extended asphalt contains at least 1 wt % bitumen, sulfur in an amount to provide a weight ratio of sulfur-to-bitumen in said sulfur extended asphalt in the range of from 1:0.1 to 1:10, and upwardly to 98 wt % aggregate, and wherein said mixing of said sulfur granules, bitumen and aggregate is conducted at a mixing temperature in the range of from 100° C. to 150° C.

19. A method as recited in claim 17, wherein said sulfur extended asphalt contains at least 1 wt % bitumen, sulfur in an amount to provide a weight ratio of sulfur-to-bitumen in said sulfur extended asphalt in the range of from 1:0.1 to 1:10, and upwardly to 98 wt % aggregate, and wherein said mixing of said sulfur granules, bitumen and aggregate is conducted at a mixing temperature in the range of from 100° C. to 150° C.

* * * * *